(12) United States Patent
Ty et al.

(10) Patent No.: US 8,330,056 B2
(45) Date of Patent: Dec. 11, 2012

(54) POWER ENTRY UNIT ELECTRICAL POWER DISTRIBUTION METHOD

(75) Inventors: Try Ty, Chicago, IL (US); Mark Kmiecik, Chicago, IL (US); Aaron P. R. Starkey, Auburn, IN (US)

(73) Assignee: Group Dekko, Inc., Kendallville, IN (US)

( * ) Notice: Subject to any disclaimer, the term of this patent is extended or adjusted under 35 U.S.C. 154(b) by 487 days.

(21) Appl. No.: 12/582,422

(22) Filed: Oct. 20, 2009

(65) Prior Publication Data

US 2011/0088941 A1 Apr. 21, 2011

(51) Int. Cl.
*H02G 3/22* (2006.01)
*H02J 1/10* (2006.01)

(52) U.S. Cl. .......................................... 174/505; 307/29
(58) Field of Classification Search .................. 174/505; 307/29

See application file for complete search history.

(56) References Cited

U.S. PATENT DOCUMENTS

| | | | | |
|---|---|---|---|---|
| 5,092,787 A * | 3/1992 | Wise et al. | ...................... | 439/215 |
| 5,281,859 A * | 1/1994 | Crane | ........................... | 307/139 |
| 5,412,529 A * | 5/1995 | Eaton et al. | ...................... | 361/90 |
| 5,595,495 A * | 1/1997 | Johnson et al. | ............... | 439/215 |
| 6,879,060 B2 * | 4/2005 | Hohri | ............................... | 307/64 |
| 7,030,734 B2 * | 4/2006 | Butler et al. | .................. | 340/3.43 |
| 7,075,769 B2 | 7/2006 | Rupert et al. | | |
| 7,095,138 B1 * | 8/2006 | Brunier | ............................ | 307/43 |
| 7,141,891 B2 * | 11/2006 | McNally et al. | ................. | 307/39 |
| 7,339,466 B2 * | 3/2008 | Mansfield et al. | ............. | 340/538 |
| 2007/0086408 A1 * | 4/2007 | Kuroda et al. | ................. | 370/344 |
| 2008/0067997 A1 * | 3/2008 | Miyata et al. | .................. | 323/318 |
| 2009/0236909 A1 * | 9/2009 | Aldag et al. | ...................... | 307/39 |
| 2010/0145542 A1 * | 6/2010 | Chapel et al. | .................. | 700/295 |
| 2010/0225167 A1 * | 9/2010 | Stair et al. | ........................ | 307/29 |
| 2010/0280774 A1 * | 11/2010 | Ewing et al. | ..................... | 702/60 |
| 2011/0100702 A1 * | 5/2011 | Hayes et al. | ..................... | 174/500 |

FOREIGN PATENT DOCUMENTS

WO  WO 2008113047 A2 *  9/2008

* cited by examiner

*Primary Examiner* — Timothy Thompson
*Assistant Examiner* — Nathan Milakovich
(74) *Attorney, Agent, or Firm* — Taylor IP, P.C.

(57) ABSTRACT

An electrical power system including a first power entry unit, at least one receptacle, and a second power entry unit. The at least one receptacle is electrically connected to the first power entry unit. The second power entry unit is electrically connectable to the at least one receptacle. The first power entry unit and the second power entry unit include at least one detection device. Either the first power entry unit or the second power entry unit is a selected power entry unit and the remaining one is another power entry unit. The detection device is configured to preclude an electrical power connection of both the selected power entry unit and the other power entry unit to the at least one receptacle.

4 Claims, 4 Drawing Sheets

POWER ENTRY UNIT ELECTRICAL POWER DISTRIBUTION METHOD

BACKGROUND OF THE INVENTION

1. Field of the Invention

The present invention relates to an electrical power supply system, and, more particularly, to an electrical power supply system, which detects more than one power source being connected to an electrical receptacle.

2. Description of the Related Art

Electrical wiring codes limit the number of receptacles which can be connected to a power entry unit. It is common for an electrical power source to be routed to an electrical receptacle and power then routed from that electrical receptacle to subsequent electrical receptacles in a daisy-chaining manner. Although the electrical wiring has the electrical receptacles connected in parallel, there is no physical limitation in the wiring to prevent the connection of further electrical receptacles without limit nor is there anything in the daisy-chaining of electrical outlets that precludes the chain of electrical outlets to be connected to more than one power source.

If a chain of electrical outlets are connected to two power sources, which happens to be of the same voltage and phase and the units function, a problem can arise in which maintenance personnel may disconnect a power source only to find out that the receptacles are still electrically energized.

Another problem can arise in which in the sequential connection of receptacles a second power source having a different voltage or phase relationship than the one connected at the other end of the chain of receptacles, thereby causing an immediate electrical issue with two voltage sources competing to supply power, which will most likely result in circuits being disconnected by circuit breakers, but generally only after exhibiting some electrical sparking or discharge. This can result in, at the very least, surprise to the maintenance personnel but also potential damage to the wiring and to the equipment attached thereto.

What is needed in the art is a system that will preclude the application of electrical power to each end of a chain of electrical receptacles.

SUMMARY OF THE INVENTION

The present invention provides an electrical power system that may be used, for example, in a modular office wall panel system.

The invention comprises, in one form thereof, a modular office system including at least one wall panel having a raceway and an electrical power system at least partially contained in the raceway. The electrical power system includes a first power entry unit, at least one receptacle, and a second power entry unit. The at least one receptacle is electrically connected to the first power entry unit. The second power entry unit is electrically connectable to the at least one receptacle. The first power entry unit and the second power entry unit include at least one detection device. Either the first power entry unit or the second power entry unit is a selected power entry unit and the remaining one is another power entry unit. The detection device is configured to detect an attempted electrical power connection of both the selected power entry unit and the other power entry unit to the at least one receptacle.

The present invention comprises, in another form thereof, an electrical power distribution method including the steps of connecting a first power entry unit to an electrical receptacle and another step of detecting a second power entry unit that is electrically connected to the electrical receptacle prior to the first power entry unit engaging electrical power to the electrical receptacle.

The present invention advantageously allows an installer to connect electrical receptacles in a sequential or non-sequential manner.

Another advantage is that only one type of interconnecting cable is necessary to connect the electrical receptacles.

A further advantage of the present invention is that each of the receptacles can be identical.

Yet still a further advantage of the present invention is that more than one power entry unit is connected to the electrical receptacles. At least one of the power entry units will not supply power to the receptacles.

Yet another advantage of the present invention is that compliance with electrical code concerns is carried out by the present invention.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplifications set out herein illustrate one embodiment of the invention and such exemplifications are not to be construed as limiting the scope of the invention in any manner.

DETAILED DESCRIPTION OF THE INVENTION

Figure 1:
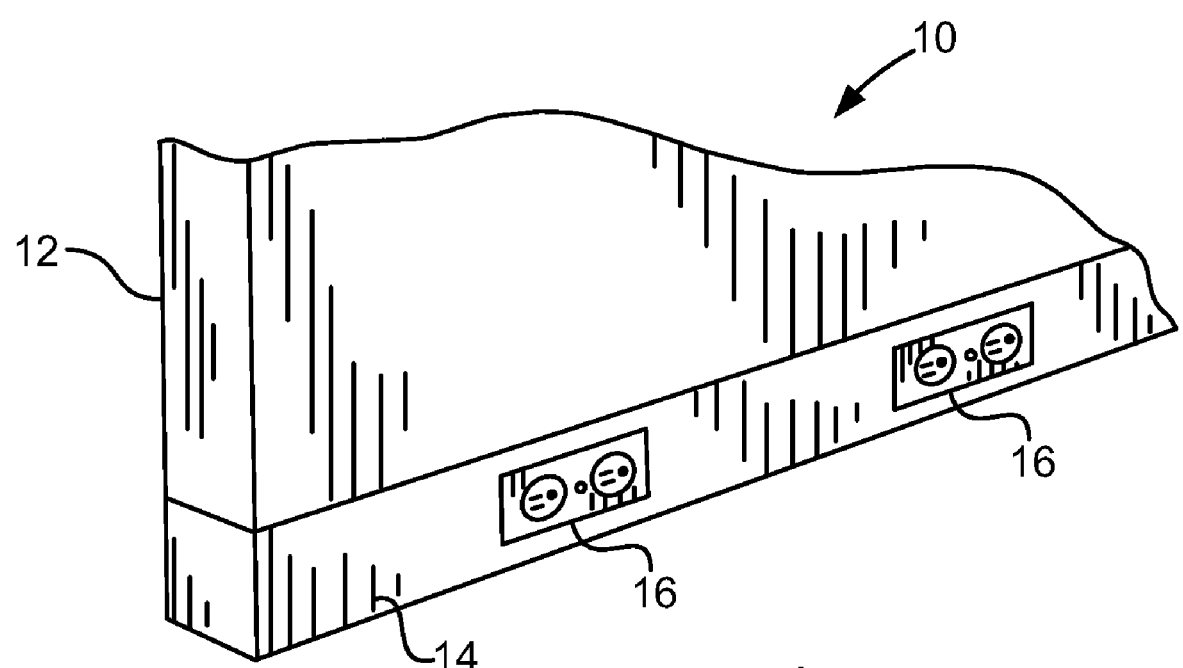
FIG. 1 is a perspective view of an embodiment of a modular office system having a wall panel with electrical receptacles positioned in a raceway.

Referring now to the drawings, and more particularly to FIG. 1, there is shown a modular office system 10 including a modular wall panel 12, a raceway 14, and electrical receptacles 16. Modular office system 10 is utilized in an office space as partitioning walls in an open floor plan environment.

Figure 2:
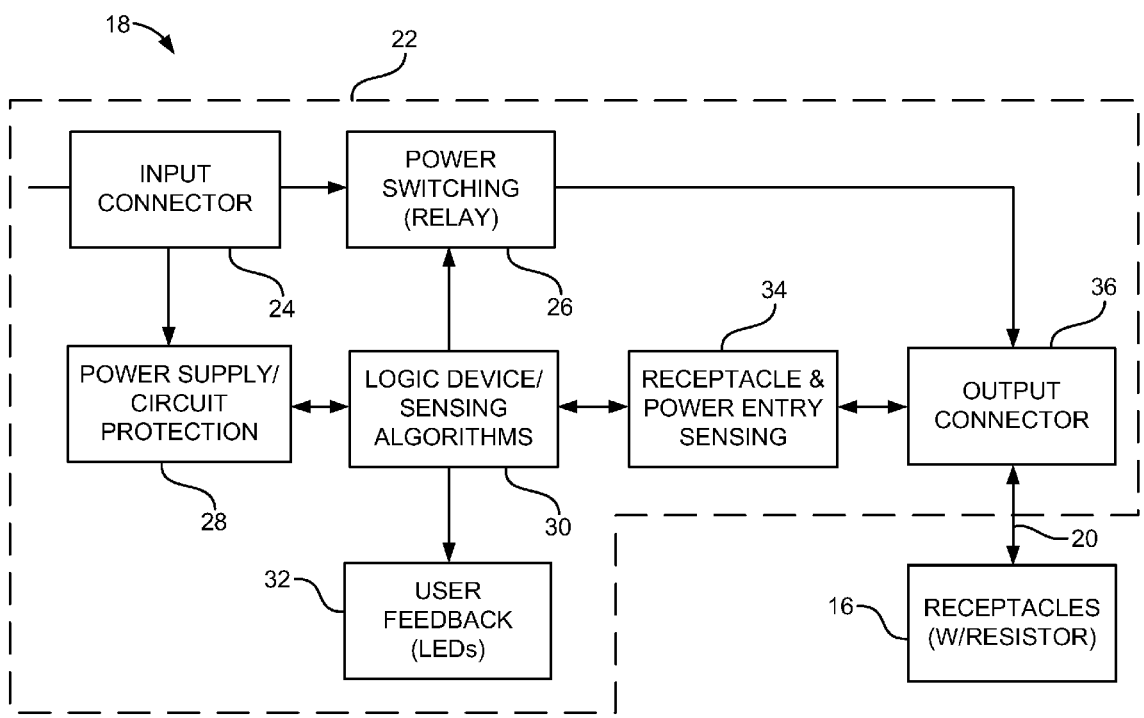
FIG. 2 is a schematic block diagram of an embodiment of the electrical power system used in the modular wall panel of FIG. 1.

Now, additionally referring to FIG. 2, there is shown electrical power system 18 that includes receptacle 16 connected by way of a multiconductor cable 20 to a power entry unit 22. Power entry unit 22 includes an input connector 24, a power switching device 26, a power supply 28, a detection device 30, feedback indicators 32, sensors 34, and an output connector 36. Input connector 24 may be a three wire connector that contains a line, neutral, and ground, and may be rated at 120 volts AC. Input connector 24 is electrically connectable to a receptacle or other electrical power source.

Input connector 24 supplies electrical power to power supply 28 and to power switching device 26. Power switching device 26 may be in the form of electrical relay 26 or a noncontact switching relay 26. Power supply 28 includes circuit protection elements to protect power supply 28. Power supply 28 provides power to detection device 30.

Detection device 30 may be implemented with logic devices, analog devices, and/or software to carry out its protection functions. Detection device 30 controls the power supplied to relay 26 and decides when relay 26 should be energized to thereby pass electrical power therethrough to output connector 36. Detection device 30 additionally provides feedback to a user by way of feedback indicators 32, which may be in the form of LEDs 32 to indicate the status of power entry unit 22. Detection device 30 communicates to sensors 34, which detect both the number of receptacles 16 connected to power entry unit 22 and also senses the attempted electrical connection of another power entry unit. Output connector 36 has exterior electrical connections so that cable 22 can pass power onto receptacles 16. Additionally, output connector 36 may be configured to supply power on some electrical connections and also pass other signals by way of other communication devices, such as optical or other communication methods. For purposes of explaining the present invention, electrical connections to output connector 36 will include line, neutral, ground, and a signal line capable of passing signals, which may be in the form of voltage levels that are altered by the connection of additional receptacles 16.

Power supply 28 creates a logic level DC voltage from the line voltage provided by way of input connector 24. This logic level DC voltage may be 5 volts DC. Detection device 30 incorporates the logical constructs and devices used to control relay 26 and to receive information from sensors 34. Detection device 30 senses the number of receptacles 16 present by measuring the voltage on the signal line by way of an analog/digital input therein. Sensors 34 interact with detection device 30 to pass a set amount of current down the sensor lines that are electrically connected to receptacle 16, which cause the voltage sensed by sensors 34 to fall or rise as receptacles are added or removed. If the resulting value of voltage is greater than a predetermined threshold, it is determined that eight or fewer receptacles are connected to power entry unit 22 and relay 26 can remain on, or is turned on after an initial power up mode. If the resulting value is less than or equal to the predetermined value of voltage, then it is determined that nine or more receptacles are connected and relay 26 is turned off, thereby de-energizing receptacles 16.

Detection device 30, along with sensors 34, additionally sense if more than one power entry unit is connected to receptacles 16. In one embodiment, detection device 30 utilizes a random or pseudo-random number generator that periodically stops driving current out of the sensor line going to receptacles 16. If another power entry unit is connected, it will still be driving current into the sensor lines and a voltage will be measured when none is expected. This causes detection device 30 to conclude that another power entry unit is electrically connected to receptacle 16. Relay 26 remains off until the situation is corrected and may additionally remain off until power is removed from input connector 24 and reapplied. The random number generator that determines the periodicity of the check of the sensor line is such that when an additional power entry unit is trying to check the same situation, then the units will not be trying to perform the sensing of each other at the same time, which would result in the units not sensing each other. It is also contemplated that the sensing operation may be preformed multiple times at random intervals of time, before concluding that relay 26 can be energized.

LED's 32 may be a red/green bicolored LED used as a feedback indicator 32. A solid green light is illuminated when relay 26 is engaged and only one power entry and eight or fewer receptacles are connected to power entry 22. A blinking red indication on LED 32 indicates that one power entry and nine or more receptacles are connected. A solid red indication by LED 32 indicates the detection of two or more power entry units connected to receptacles 16.

Sensor 34 perform two separate, independent functions in that they sense the number of receptacles 16 connected to electrical power system 18 and sense if one or more power entries are also connected thereto.

Receptacles 16 are standard three prong outlet receptacles containing a line output, which is switched by power relay 26, a neutral, and a ground. There is also a wire that is connected to a device that is sensed by sensors 34. A device that is detected within receptacle 16 may be a resistor, the presence of which is detected by a change in voltage as additional receptacles 16 are connected thereto. Alternatively, the device in receptacle 16 may be some other electrical device, such as a capacitor, inductor, or logic element, for example. The device then loads or alters the signal sent on the sensor line so that detection device 30 can determine the number of receptacles 16 are connected to power entry unit 22. Additionally, the device can be an optical element or some other element that provides information over the lines connected by way of cable 20 so that detection device 30 may detect the additional connection of receptacles 16.

Figure 3:
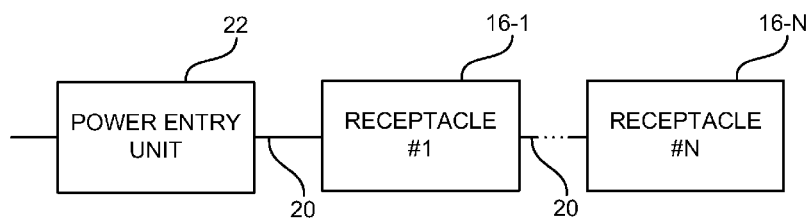
FIG. 3 is a schematic block diagram illustrating the connection of a power entry unit used in the power supply system of FIGS. 1 and 2 connected to a series of receptacles.

Now, additionally referring to FIG. 3, there is illustrated a power entry unit 22 connected to receptacle 16-1 through 16-N. When the number of receptacles exceed a predetermined number, such as eight, then power entry unit 22 takes action, which may include a visual indicator by way of LED 32 and/or the disconnection of power to receptacles 16-1 though 16-N by the de-energizing of relay 26.

Figure 4:
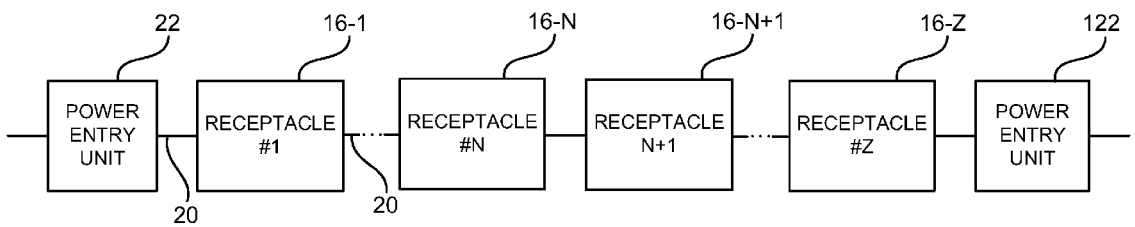
FIG. 4 is another block diagram illustrating the connection of a series of receptacles and more than one power entry unit.

Now, additionally referring to FIG. 4 where a number of receptacles including 16-1, 16-N, 16-N+1, and 16-Z are physically connected to a power entry unit 22 and an additional power entry unit 122. Power entry unit 122 is substantially similar to power entry unit 22 in that sensor lines are connected therebetween by way of cables 20. Although FIG. 4 denotes a sequential connection of receptacles between power entry unit 22 and power entry unit 122, it is also to be understood that receptacles could branch off therefrom and that the electrical connection is still an electrical parallel connection. So whether they are depicted in a sequential linear arrangement such as in FIG. 4 or branched off in other physical configurations, electrically, receptacles 16-1 through 16-Z are electrically connected in parallel.

Power entry unit 22 and power entry unit 122 are physically connected. When power is supplied to both power entry unit 22 and power entry unit 122 before the relay 26 in each power entry unit is energized, the present invention carries out a sequence of steps to preclude electrical power from being applied by both power entry unit 22 and power entry unit 122. The present invention carries out its function in that each of the power entry units detect the presence of each other by way of the electrical signals on the signal line so that electrical power is not connected to the line of receptacles 16 by either of the power entry units.

Figure 5:
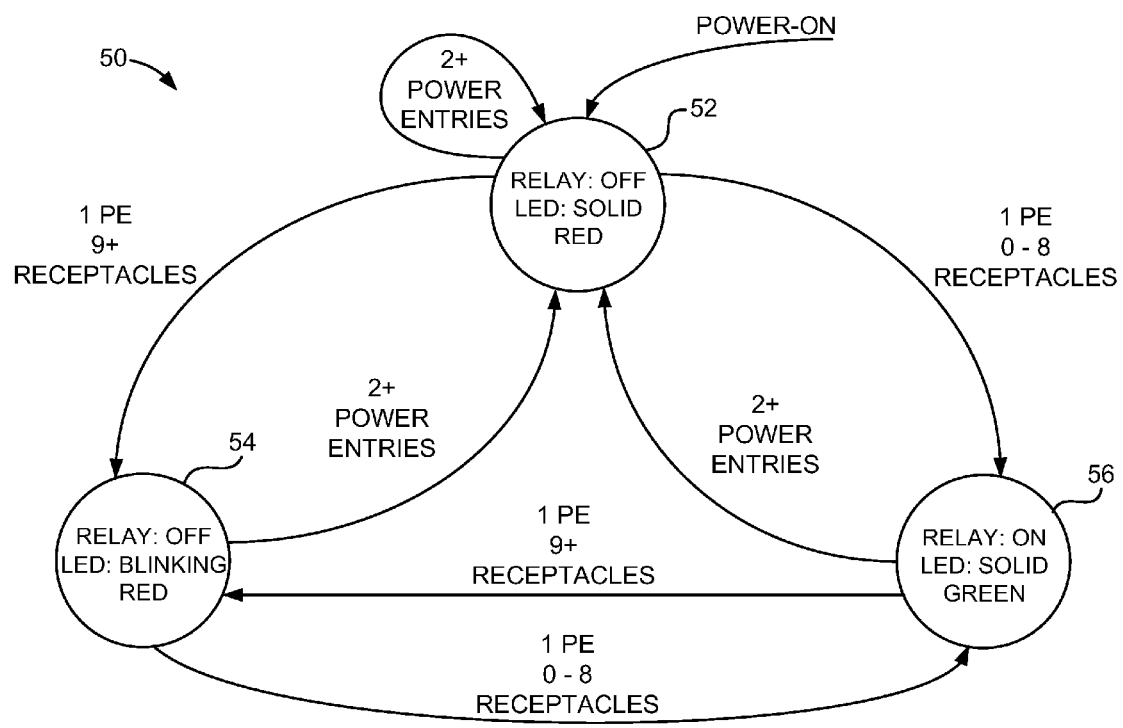
FIG. 5 is a state diagram illustrating the functions of the present invention of FIGS. 1-4.

Now, additionally referring to FIG. 5, there is illustrated a state diagram 50 of electrical power system 18. State 52 is entered when power is supplied to a power entry unit. At that point, relay 26 is off and LED 32 is solid red. If power entry unit 22 detects that it is the only power entry unit and that between zero and eight receptacles are electrically connected thereto, then power entry unit 22 proceeds to state 56, where relay 26 is activated, LED 32 is changed to solid green and receptacles 16 are electrically energized. This is the normal operating condition of power entry unit 22; however, it continuously checks to determine if too many receptacles 16 are connected thereto or if an additional power entry unit is connected to the receptacles connected to power entry unit 22. While in state 56, if an additional power entry unit is detected, then power entry unit 22 transitions to state 52 with relay 26 being de-energized and LED 32 being changed to a solid red color. Additionally, when in state 56, if nine or more receptacles are detected, then power entry unit 22 transitions to state 54 where relay 26 is de-energized and LED 32 will blink red.

While power entry unit 22 is in state 54, if it detects that the number of receptacles have been reduced to eight or fewer and that there is only one power entry unit, then power entry unit 22 transitions to state 56, relay 26 is energized, and LED 32 is illuminated as solid green. If while in state 54 two or more power entry units are detected, then power entry unit 22 transitions to state 52 where relay 26 remains off and LED 32 is illuminated as solid red. If while in state 52 power entry unit 22 detects the reduction to one power entry unit and yet nine or more receptacles, then power entry unit 22 transitions to state 54 where relay 26 remains de-energized and LED 32 blinks red. Also, while in state 52 as long as two or more power entry units are detected then power entry unit 22 remains in state 52. Also, as previously noted, if while in state 52 one power entry unit and eight or fewer receptacles are detected, then power entry unit transitions from state 52 to state 56.

Each receptacle 16 as well as each power entry unit may have an internal resistor of 1,000 ohms between the signal line and ground. Connecting multiple receptacles together therefore also connects multiple 1K resistors together in parallel. Detector 30 may utilize the parallel resistor formula to determine the number of receptacles connected to power entry unit 22 since $(1/R)=R1+1/R2+ \ldots 1/Rn$. The total resistance between the signal line and ground can be calculated based on the number of receptacles connected. This total resistance is the resistance seen by the power entry module. The power entry module provides a constant current of, for example, 15 mA through this total resistance. In this manner, the number of receptacles can be calculated by detector 30 and, upon exceeding a predetermined number, such as eight, it may de-energize relay 26. However, if the measured voltage is below the threshold, there are more than eight receptacles and detector 30 will de-energize relay 26. The sensing of the number of receptacles connected to a power entry unit may be temporarily suspended when power entry unit 22 attempts to detect the connection of an additional power entry unit.

Another method of detecting a power entry unit includes each power entry unit monitoring the voltage on the signal line as explained above. Each of the power entry units will randomly or pseudo-randomly short the signal line to ground causing the second power entry module to see the signal line voltage as zero volts and turn off its relay 26. This shorting to ground of the signal line in a random manner avoids power entry units from every synching together and not detecting each other. The pseudo-random or random number generator can be considered an event generator that selects a time in which to alter the detection signal sent from the power entry unit to thereby enable the detection device 30 to sense detection signal being sent from another power entry unit. The concept of attempted electrical power connection should be understood to mean that the actual electrical power is not connected if either the power entry unit detects another power entry unit or if too many electrical receptacles are connected to the power entry unit. It is to be understood that the power entry unit is physically connected but the actual electrical power distribution is held in abeyance until the power entry units are correctly configured to only supply separate sets of electrical receptacles.

The present invention advantageously precludes the erroneous interconnection of multiple electrical power entry units and additionally precludes the connection of too many receptacles to a single power entry unit.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An electrical power distribution method, comprising the steps of:
   connecting a first power entry unit to at least one electrical receptacle;
   connecting a second power entry unit to at least one electrical receptacle; and
   precluding an application of electrical power to said at least one electrical receptacle when electrical power is supplied to both said first power entry unit and said second power entry unit.

2. The method of claim 1, further comprising the step of engaging electrical power to said at least one electrical receptacle when electrical power is supplied to only one of said first power entry unit and said second power entry unit.

3. The method of claim 1, further comprising the step of altering an illumination of an indicator dependent upon electrical power being supplied to both of said first power entry unit and said second power entry unit.

4. The method of claim 1, further comprising the step of selecting a time and at said time altering a detection signal sent from said first power entry unit thereby enabling said first power entry unit to sense a detection signal being sent from said second power entry unit to thereby detect the attempted electrical power connection of said first power entry unit to said at least one electrical receptacle.

* * * * *